United States Patent [19]
Robey

[11] Patent Number: 4,877,519
[45] Date of Patent: Oct. 31, 1989

[54] REACTOR AND HEAT EXCHANGER SYSTEM FOR CYANIDE WASTE WATER TREATMENT

[75] Inventor: Herbert L. Robey, Milton, Canada

[73] Assignee: Cyanide Destruct Systems, Inc., Ontario, Canada

[21] Appl. No.: 212,494

[22] Filed: Jun. 28, 1988

[51] Int. Cl.⁴ .............................................. B01D 17/12
[52] U.S. Cl. ........................................ 210/86; 165/13; 165/66; 210/104; 210/149; 210/181; 210/904; 422/106; 422/110; 422/198
[58] Field of Search .................... 210/97, 98, 175, 181, 210/742, 744, 763, 766, 761, 805, 903, 904, 750, 761, 765, 104, 149, 143, 86, 87; 544/190–192; 165/30, 39, 65, 66, 13; 422/106, 110, 198

[56] References Cited

U.S. PATENT DOCUMENTS

| | | | |
|---|---|---|---|
| 3,592,586 | 7/1971 | Scott | 210/904 |
| 3,808,126 | 4/1974 | Pradt | 210/761 |
| 3,833,056 | 9/1974 | McMinn et al. | 165/30 |
| 3,945,919 | 3/1976 | Schindewolf | 210/750 |
| 4,042,502 | 8/1977 | Schmidt et al. | 210/766 |
| 4,294,706 | 10/1981 | Kakihara et al. | 210/903 |
| 4,402,837 | 9/1983 | Okugawa | 210/766 |
| 4,610,298 | 9/1986 | Van Schagen et al. | 165/66 |
| 4,651,813 | 3/1987 | Witt et al. | 165/30 |
| 4,738,302 | 4/1988 | Abma | 165/66 |

Primary Examiner—Richard V. Fisher
Assistant Examiner—Joseph Drodge
Attorney, Agent, or Firm—Basile and Hanlon

[57] ABSTRACT

A waste water treatment system for high temperature hydrolysis of cyanides has a reactor operating at a sufficiently high temperature and pressure to effect hydrolysis of cyanide in the waste waters. A heat exchanger system is provided through which reactor effluent and reactor influent streams flow. The improved waste water treatment system includes a first tube in tube heat exchanger for an influent stream and a second tube in tube heat exchanger for an effluent stream. A heat exchange medium is circulated between the effluent heat exchanger and the influent heat exchanger to cool down the effluent and in turn use the heat to heat up the influent to the reactor. The heat exchangers are arranged such that the influent and effluent streams pass through the tube side of each heat exchanger to minimize clogging of the first and second heat exchangers, while at the same time providing for effective heat exchange in cooling the effluent and heating up the waste waters to be treated.

6 Claims, 2 Drawing Sheets

REACTOR AND HEAT EXCHANGER SYSTEM FOR CYANIDE WASTE WATER TREATMENT

FIELD OF THE INVENTION

This invention relates to waste water treatment systems particularly adapted for the high temperature hydrolysis of cyanides in the waste waters.

BACKGROUND OF THE INVENTION

Cyanides are used in a variety of industrial applications, such as in the art of electroplating, steel heat treating and mining. In these processes, however, the waste solutions contain cyanide which presents a significant environmental hazard. Strict governmental regulations are in place which control the release of cyanides. This has necessitated the development of various processes to remove cyanides from waste waters. One example of treating cyanides is by alkaline chlorination. Chlorine and sodium hydroxide may be used to oxidize the cyanide to cyanates and subsequently to carbon dioxide and water. The problem with the alkaline chlorination process is that:

(1) chemical consumption increases with cyanide content in the waste waters; hence significantly increasing operating costs;
(2) the process does not destroy iron and other complex cyanides and hence dilution must be relied upon to comply with regulations;
(3) very careful control of the reaction is required; otherwise toxic cyanogen chloride can be released.

Another technique for removing cyanide from waste waters is by way of hydrolysis. At high temperatures and pressures, the following reaction proceeds rather quickly:

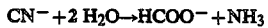

$$CN^- + 2 H_2O \rightarrow HCOO^- + NH_3$$

An example of such hydrolysis is disclosed in U.S. Pat. No. 4,042,502. This patent discloses the use of a heat exchanger which has first and second flow paths where the second flow path is in heat exchange contact with fresh cyanide solution which is introduced to the heat exchanger through the first flow path. For the system to function, there is a continuous effluent flow to ensure constant heat exchange with continuous inflow of waste waters to be treated. Preferably, laminar flow is maintained within the heat exchanger which also constitutes the reactor. By way of heating the incoming waste waters in a preheater to a temperature of more than half the temperature reached in the heat exchange reactor, the system provides for continuous reaction within the heat exchanger. However, it is appreciated that with cyanide hydrolysis reactions, solids are generated as the cyanides are destroyed creating a build-up of sludge which presents a significant problem in having the reaction carried out within the heat exchanger due to flow of the effluent through valves and the like in which sludge can build up and detract from the overall efficiency of the hydrolysis reaction in the heat exchanger.

SUMMARY OF THE INVENTION

In accordance with an aspect of the invention, a waste water treatment system for high temperature hydrolysis of cyanide in a waste water stream has a reactor operating at a sufficiently high temperature and pressure to effect hydrolysis of any cyanide in a waste water stream introduced to the reactor. A heat exchanger system is provided, through which effluent from the reactor flows and an influent waste water stream flows prior to introduction to the reactor.

The improvement comprises a first double pipe heat exchanger for an influent stream and a second double pipe heat exchanger for an effluent stream. The first and second heat exchangers each have a tube side inlet and an annular space inlet. A first conduit delivers an influent stream to the tube side inlet of the first heat exchanger. A second conduit delivers an effluent stream from the reactor to the tube side inlet of the second heat exchanger. The first and second heat exchangers have a tube side outlet and an annular space outlet. Means is provided for circulating a heat exchange medium through the annular space inlets and outlets of the first and second heat exchangers to preheat an influent stream prior to introduction to the reactor where energy for preheating is extracted from an effluent stream passing through the second heat exchanger, whereby influent and effluent streams pass through the tube side of each of the first and second heat exchangers to minimize clogging of the first and second heat exchangers.

BRIEF DESCRIPTION OF THE DRAWINGS

Preferred embodiments of the invention will be discussed with respect to the reactor system schematically shown in FIG. 1 of the drawings.

DETAILED DESCRIPTION OF THE PREFERRED EMBODIMENTS

Figure 1:
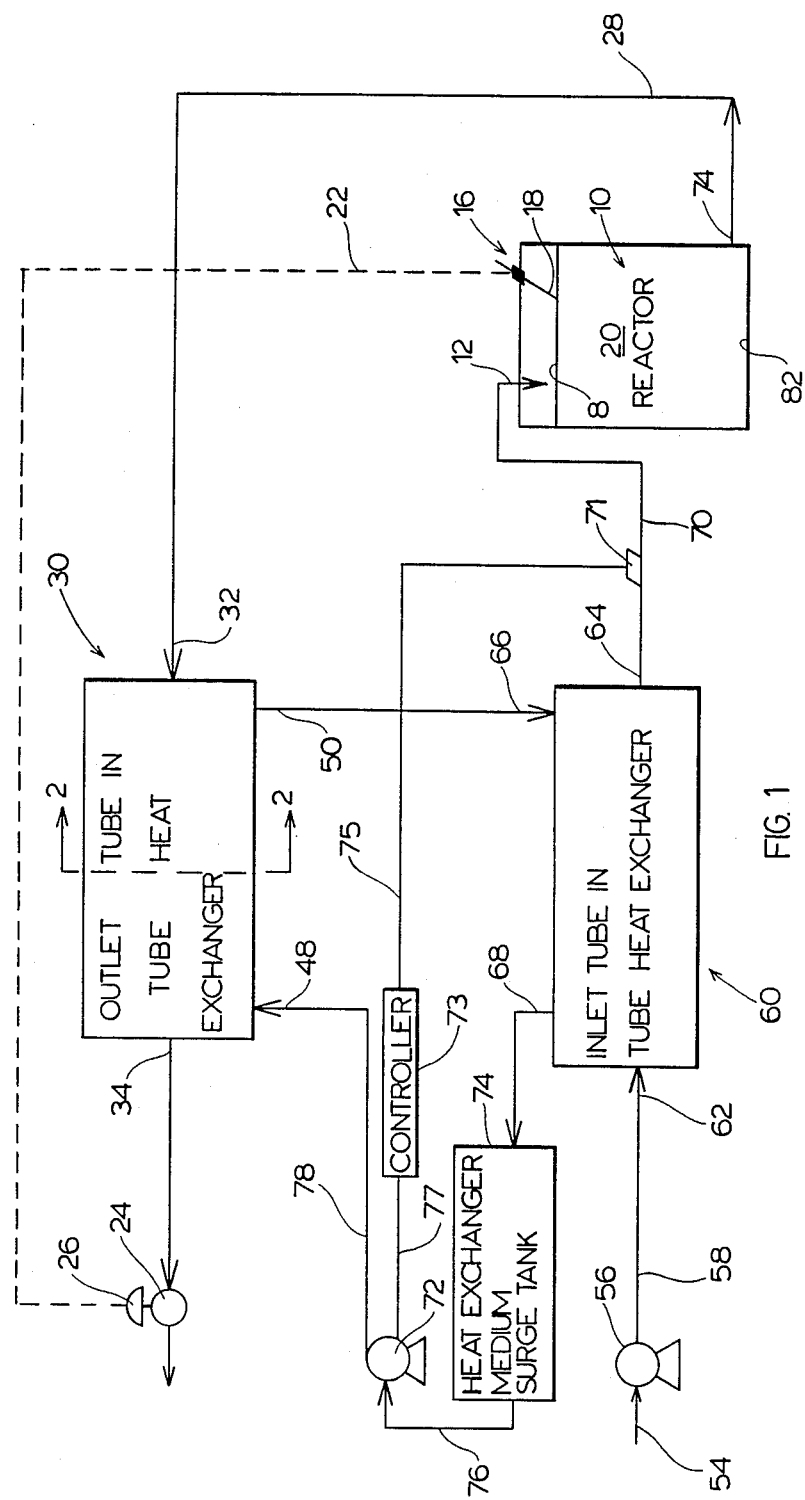

The operating temperature of the reactor system is normally in the range of 250° C. at an operating pressure of approximately 45 atmospheres. It is appreciated by those skilled in the art that variations in the temperature and pressures may be employed depending upon the condition of the waste waters to be treated. Hence the reactor 10, as shown in FIG. 1, is a closed system with an inlet 12 and an outlet 14. A level control generally designated 16 is provided within the reactor having a level probe portion 18, or other suitable level detection device, such as a differential pressure measuring device, ultrasonic level sensor or gamma radiation detection device. For example, the alternative pressure sensor could be calibrated to cause opening of the valve 24 when the pressure reaches 650 psi and to close the valve when the pressure drops to 600 psi. The purpose of the probe 18 is to sense the level of the reaction medium 20 within the reactor. The inlet 20 provides on a continuous basis a flow of waste waters to be treated. Once the probe 18 senses the medium level, a signal is generated in the level control device 16 and transmitted via line 22 to the outlet valve 24 having electronic controller 26. Upon receiving a signal in line 22 to open, the valve 24 remains open under the control of controller 26 for a predetermined period of time to lower the medium level 20 in the reactor 10 well below the probe 18. For example, when the system is adapted to treat approximately 1,000 gallons per day and in view of the high pressures within the reactor, an opening of the valve to a fully open position for approximately 2 to 5 seconds per minute is sufficient to drop the level of the medium in the reactor 10. With the continuous inlet flow, the medium level continues to rise in the reactor until the probe 18 senses the medium again to actuate the cycle all over again to partly drain the reactor. Hence there is a continuous inflow of waste waters to be treated and an intermittent outflow of effluent at the outlet 14.

To capture the heat in the outlet stream in line 28, a heat exchanger 30 is provided through which the effluent passes. The inlet to the heat exchanger is at 32. The outlet for the effluent is at 34. The heat exchanger 30 is in the form of a tube-in-tube heat exchanger, as shown in more detail in FIG. 2. The heat exchanger 30 has an outer tubular shell 36 with an inner tube 38 passing therethrough. The end 40 of the heat exchanger is sealed at 42 about the perimeter of the tube 38. Hence the effluent inlet is defined at 32. The effluent travels in the direction of arrow 44 through the interior 46 of the tube 38.

Figure 2:
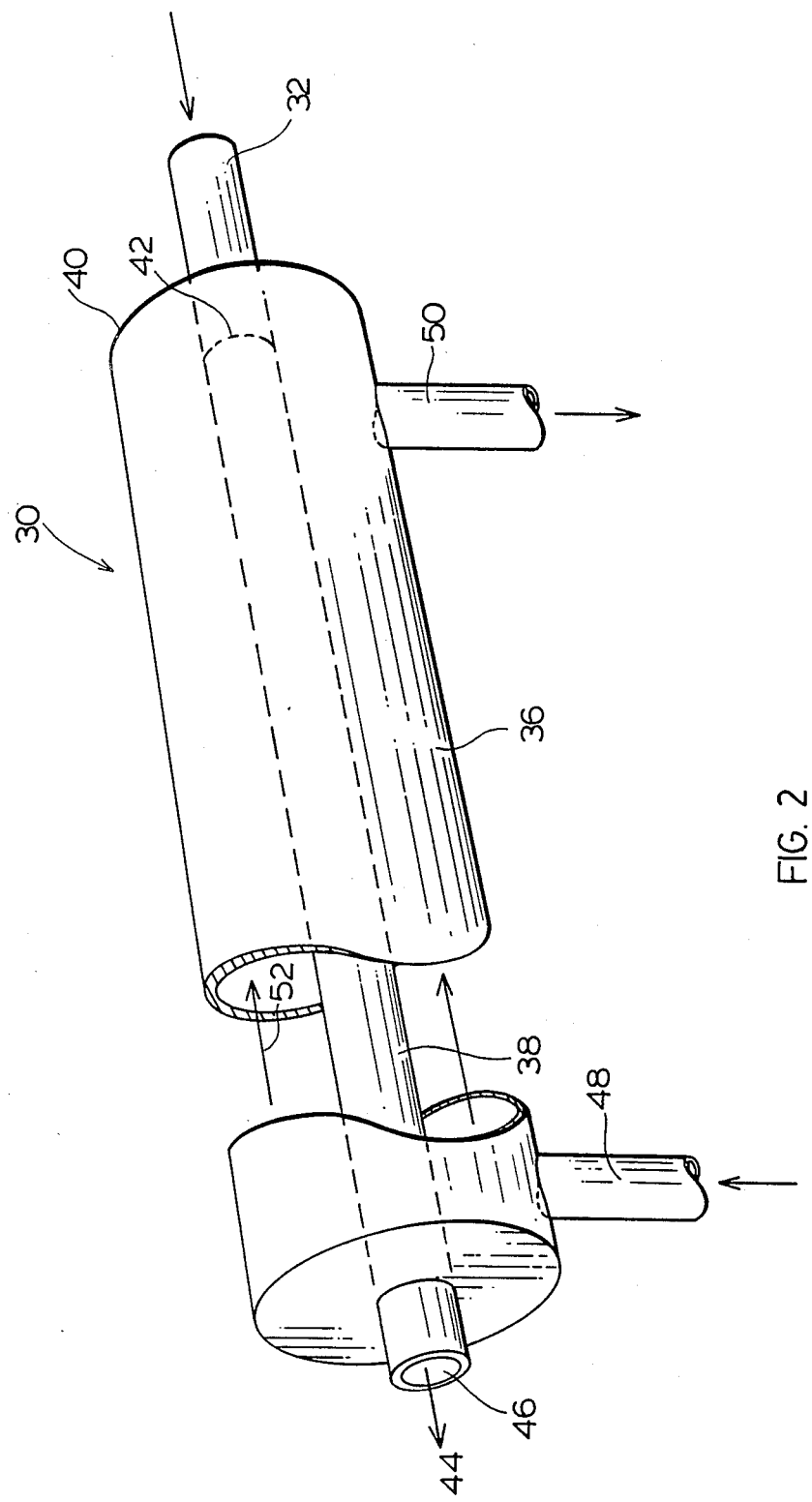
FIG. 2 is a section through a representative type of double pipe heat exchanger taken along the lines 2—2 of FIG. 1.

As shown in FIG. 1, a heat exchange medium is introduced at 48 to the heat exchanger 30 with an outlet at 50. In accordance with this embodiment, as shown in FIG. 2, the cooling medium travels in the direction of arrows 52 to the outlet 50. The heat exchange medium then flows in a counterflow direction relative to the direction of flow of the effluent through the tube into the heat exchanger. In this manner, the effluent travels straight through the heat exchanger 30 without encountering any obstructions. Hence as the effluent cools down under exchange with the heat exchange medium 52, solids do not build up on any obstructions within the heat exchanger. The valve 24, when fully opened, causes sufficient turbulence within the heat exchanger 30 to clear out any solids which may deposit within the short time during which the reactor is being replenished with incoming waste waters to be treated.

The incoming waste waters are provided in line 54 to the inlet of pump 56. The pump 56 produces sufficient pressure in line 58 which is slightly in excess of the pressure in the reactor 10 to feed the waste waters to the inlet heat exchanger 60. The inlet to the heat exchanger is at 62 with an outlet at 64. The construction of the tube-in-tube heat exchanger 60 is the same as that of heat exchanger 30. The heat exchange medium is introduced to heat exchanger 60 at the inlet 66 and flows countercurrent to the flow of the waste waters and is removed from the heat exchanger at 68. The waste waters as heated in heat exchanger 60 pass along line 70 to the inlet 12 of the reactor 10.

The heat exchange medium is circulated through the outlet heat exchanger 30 and the inlet heat exchanger 60 via the pump 72. The heat exchange medium is introduced to the surge tank 74 which has an outlet 76 connected to the inlet of the pump 72. The outlet of the pump 72 feeds into line 78 which is in turn connected to the inlet 48 of the heat exchanger 30. The heat exchange medium may then be continuously circulated between the two heat exchangers 30 and 60. The purpose of the surge tanks 74 is to ensure that heat exchange medium is always present at the pump suction or inlet side of the pump 72.

According to a preferred embodiment of this invention, a temperature sensor 71 is provided in line 70. The temperature sensor 71 has an input to pump controller 73 via line 75. The controller 73 inputs and controls the speed of the pump 72 via line 77. The controller has a suitable input device, such as a keyboard, to permit entry of the desired temperature in line 70. The controller 73 then varies the speed of the pump 72 to adjust the flow rate of the heat exchange medium in the correct direction until the desired temperature in line 70 is achieved. It is appreciated, however, that the heat exchanger could be sized to produce the desired temperature profile and hence temperature in line 70.

In this manner the incoming waste waters are heated in a heat exchanger separate from the heat exchanger which cools down the effluent. This greatly simplifies the overall operation of the system allowing the independent operation of the reactor 10, while at the same time extracting heat from the effluent and not clogging of the system in either the reactor or the influent or effluent heat exchangers.

Since there may also be solids creation within the reactor 10, the inlet to the reactor is located above the medium level 80 so that solids cannot clog up the inlet 12. Further considerations in the operation of the system is with respect to the outlet valve 24. Preferably this is of a ball type valve construction with fully open and closed positions to avoid clogging and abrasion of the valve when open. It is also appreciated that, by the intermittent opening and closing of the valve 24, the flow of effluent is intermittent through the heat exchanger 30. However, with the continuous flow of the heat exchange medium through the outlet heat exchanger when there is a sudden flow of effluent, the substantial rise in temperature within the heat exchanger is immediately counter-reacted by the constant flow of the heat exchange medium to optimize on removal of heat from the effluent and in turn heating of the incoming waste waters to a mid-range of temperature prior to entry to the reactor. The moderation of temperature affected by the heat exchange medium also minimizes the potential for scale formation on the tube walls of the incoming waste waters.

Under use conditions, the temperature of the reactor 10 may be in the range of 225° C. to 275° C. with an operating pressure of approximately 500 to 1000 psi. The volume of the reactor is selected to provide for residence time of a few minutes up to approximately 5 hours, this, of course, being dependent upon the type of cyanide present in the waste waters and the operating temperature of the reactor. The effluent will usually emerge from the outlet heat exchanger at a temperature in the range of 70° C. in outlet 34. The heat exchange medium, as it emerges from line 50 of the heat exchanger, will normally be at a temperature in the range of 230° C.. The heating medium, as it exits the inlet heat exchanger in line 68, will be at a temperature in the range of approximately 38° C.. As a result, the heat exchange medium as it enters the heat exchanger 30 in line 48 will be at roughly the same temperature of 38° C.. The incoming waste waters, as they exit the heat exchanger 60, will be at a temperature in the range of 190° C..

It has been discovered that, by controlling the temperature of the waste water effluent from the first heat exchanger, significant advantages can be realized with this double heat exchange system. The temperature of the waste waters in the first heat exchanger is increased only to an upper maximum which avoids any significant hydrolysis of the cyanides. The reason for this is that premature hydrolysis of the cyanides in the heat exchanger can cause a scale formation on the exchanger interior. By use of the heat exchange system of this invention, the temperature of the waste waters can be controlled without causing any reaction of the cyanides by varying the rate of circulation of the heat exchange medium circulating between the inlet and outlet heat exchangers. If the pump speed is increased, the the waste waters are heated to a lower temperature whereas if the pump speed is reduced, then the waste waters are heated to a higher temperature. Hence control of the pump speed can adjust the temperature of the waste waters to a level just below the maximum temperature which would induce significant reactions of the cyanide.

Without the heat exchange system of this invention, such control on the waste water temperature cannot be achieved. If the incoming waste waters are heat exchanged directly with the reactor effluent, a large temperature gradient across the waste water stream develops because of the very high temperature of the reactor effluent. The large temperature gradient results in significant hydrolysis of the cyanides and formation of a scale on the hot surfaces of the heat exchange. Such baked on scale is very difficult to remove. This large temperature gradient in the incoming waste or reactor effluent is avoided in the heat exchange system of this invention so that baked on scale build-up in the heat exchangers is avoided.

The apparatus in providing for an integrated network of two heat exchangers transferring heat from the effluent to the incoming waste waters minimizes clogging of the system. Waste waters only flow through the tube side and not through the annular spaces. Hence the probability of plugging either heat exchanger is reduced as no sharp corners are present and flow tolerances are greater on the tube side. If in some event blockages or obstructions do occur in either heat exchanger, they are very easily cleared from the tube side of the heat exchanger. Temperature gradients are reduced significantly within the heat exchangers which lowers the possibility of scaling on the walls, particularly in the first heat exchanger. The reactor is designed to provide for intermittent discharge of effluent for brief intervals in a manner which also avoids solids build-up in the system. This avoids the need for some other form of continuous discharge effluent which is normally the case with a continuous provision of incoming waste waters. As a result, no proportional control valves are needed which would readily clog and suffer severe abrasion.

Although preferred embodiments of the invention have been described herein in detail, it will be understood by those skilled in the art that variations may be made thereto without departing from the spirit of the invention or the scope of the appended claims.

I claim:

1. In a waste water treatment system for high temperature hydrolysis of cyanide in a waste water stream, said system having a reactor constructed to operate at a sufficiently high temperature and pressure to effect hydrolysis of cyanide in a waste water stream introduced to said reactor and a heat exchanger system, with a means for flowing an influent waste water stream through said heat exchanger system prior to introduction to said reactor and a means for an effluent stream from said reactor through said heat exchanger system, the improvement comprising said heat exchanger system having a first double pipe heat exchanger for said influent stream, and a second double pipe heat exchanger for said effluent stream, each of said double pipe heat exchangers having an inner tube which defines a tube side tube of the heat exchanger and an annular space between an outer tubular shell and said inner tube to define an annular space tube of the heat exchanger, said first and second heat exchanger each having an inlet for the tube side of said corresponding heat exchanger and an inlet for the annular space of the corresponding heat exchanger, a first conduit for delivering said influent stream to said tube side inlet of first heat exchanger, a second conduit for delivering said effluent stream from said reactor to said tube side inlet of said second heat exchanger, said first and second heat exchanger each having an outlet for the tube side of said corresponding heat exchanger and an outlet for the annular space of the corresponding heat exchanger, means for circulating a heat exchange medium through said annular space inlets and outlets of said first and second heat exchangers to preheat said influent stream prior to introduction into said reactor where energy for preheating is extracted by said second heat exchanger from said effluent stream passing through said second heat exchanger to add heat energy to said heat exchange medium, said first heat exchanger removing heat energy from said heat exchange medium to preheat said influent stream whereby influent and effluent streams pass through said tube side of each inner tube of said first and second heat exchangers to minimize clogging of said first and second heat exchanger;

said reactor comprising a closed vessel with an inlet and an outlet, a third conduit extending from said tube side outlet of said first heat exchanger to said reactor inlet, said second conduit being connected to said reactor outlet, said reactor having a level control device located below said inlet to provide a liquid level in said reactor below said inlet to ensure that said inlet is above reacting liquid in said reactor, said outlet located at a lower level in said reactor to define a downflow reactor zone, said level control device comprising a control valve for controlling liquid flow in said reactor located below said inlet, said liquid level sensor generating a signal to open fully said control valve when said liquid level sensor senses liquid, means for fully closing said valve after sufficient liquid is drained from said reactor to drop reacting liquid level below said liquid level sensor to provide an intermittent flow of effluent to said second conduit.

2. In a treatment system of claim 1, said means for circulating said heat exchange medium comprising a pump which draws heat exchange medium from a tank into which heat exchange medium from said heat exchangers flow.

3. In a treatment system of claim 1, said first and second heat exchangers having waste water and treated water, respectively, the heat exchange medium flows in a first direction through the inner tubes of the first and second heat exchanger and the heat exchange medium flows in a counterflow direction through the first and second heat exchanger relative to said first direction of flow.

4. In a treatment system of claim 1, means for controlling said circulating means to control rate of flow of the heat exchange medium, said control rate means including means for sensing temperature of waste water in said outlet for said inner tube of said first heat exchanger, said control means varying rate of flow of the heat exchange medium to maintain a desired temperature of waste water at said outlet of said inner tube of said first heat exchanger.

5. In a waste water treatment system for high temperature hydrolysis of cyanide in a waste water stream, said system having a reactor constructed to operate at a sufficiently high temperature and pressure to effect hydrolysis of cyanide in a waste water stream introduced to said reactor and a heat exchanger system with means for flowing an an influent waste water stream flowing through said heat exchanger system prior to introduction to said reactor and a means for flowing an effluent stream from said reactor through said heat exchanger system, the improvement comprising said heat exchanger system having a first double pipe heat exchanger for said influent stream and a second double pipe heat exchanger for said effluent stream, each of said double pipe heat exchangers having an inner tube which defines a tube side tube of the heat exchanger and an annular space between an outer tubular shell and said inner tube to define an annular space tube of the heat exchanger, said first and second heat exchangers each having an inlet for the tube side of said corresponding heat exchanger and inlet for the annular space of the corresponding heat exchanger, a first conduit for delivering said influent stream to said tube side inlet of said first heat exchanger, a second conduit for delivering said effluent stream from said reactor to said tube side inlet of said second heat exchanger, said first and second heat exchangers each having an outlet for the tube side of said corresponding heat exchanger and an outlet for the annular space of the corresponding heat exchanger, means for circulating a heat exchange medium through said annular space inlets and outlets of said first and second heat exchangers to preheat said influent stream prior to introduction into said reactor where energy for preheating is extracted by said second heat exchanger from said effluent stream passing through said second heat exchanger to add heat energy to said heat exchange medium, said first heat exchanger removing heat energy from said heat exchange medium to preheat said influent stream whereby influent and effluent streams pass through said tube side of each inner tube of said first and second heat exchangers to minimize clogging of said first and second heat exchangers;

said reactor comprising a closed vessel with an inlet and an outlet, a third conduit extending from said outlet of said first heat exchanger to said reactor inlet, said second conduit being connected to said reactor outlet, said reactor having a level control device located below said inlet to provide a liquid level in said reactor below said inlet to ensure that said inlet is above reacting liquid in said reactor, said outlet is at a lower level in said reactor to define a downflow reactor zone, said level control device comprising a control valve for controlling liquid flow in said second conduit and a liquid level sensor in said reactor located below said inlet, said liquid level sensor generating a signal to open fully said control valve when said liquid level sensor senses liquid, means for fully closing said valve after sufficient liquid is drained from said reactor to drop reacting liquid level below said liquid level sensor to provide an intermittent flow of effluent to said second conduit, wherein said control valve is a ball valve with a fully open position and a fully closed position, said fully open position of said ball valve avoiding clogging and abrasion of said ball valve.

6. A waste water treatment system for high temperature hydrolysis of cyanide in a waste water stream, said system comprising:

a reactor constructed to operate at a sufficiently high temperature and pressure to effect hydrolysis of cyanide in a waste water stream introduced to said reactor;

a heat exchanger system, through which an influent waste water stream flows prior to introduction to said reactor, and an effluent stream flows after treatment in said reactor, the heat exchanger system comprising a first double pipe heat exchanger for said influent stream and a second double pipe heat exchanger for said effluent stream, each of said double pipe heat exchangers having an inner tube which defines a tube side tube of the heat exchanger and an annular space between an outer tubular shell and said inner tube to define an annular space of the heat exchanger, said first and second heat exchangers each having an inlet for the tube side of said corresponding heat exchanger and an inlet for the annular space of the corresponding heat exchanger, a first conduit for delivering said influent stream to said tube side inlet of said first heat exchanger, a second conduit for delivering said effluent stream from said reactor to said tube side inlet of said second heat exchanger, said first and second heat exchangers each having an outlet for the tube side of said corresponding heat exchanger and an outlet, means for circulating a heat exchange medium through said annular space inlets and outlets of said first and second heat exchangers to preheat said influent stream prior to introduction into said reactor where energy for preheating is extracted by said second heat exchanger from said effluent stream passing through said second heat exchanger to add heat energy to said heat exchange medium, said first heat exchanger removing heat energy form said heat exchange medium to preheat said influent stream whereby influent and effluent streams pass through said tube side of each inner tube of said first and second heat exchangers to minimize clogging of said first and second heat exchangers;

a surge tank in fluid communications with and located downstream of said first heat exchanger and upstream of said second heat exchanger;

a variable speed pump associated with said surge tank said pump being located in said second conduit and having means for adjusting the flow rate in said first conduit; and means for controlling the speed of said pump including a temperature sensor located in said first conduit.

* * * * *